US 6,644,019 B2

(12) United States Patent
Morikawa et al.

(10) Patent No.: US 6,644,019 B2
(45) Date of Patent: Nov. 11, 2003

(54) COMBUSTION CONTROL APPARATUS FOR ENGINE

(75) Inventors: Koji Morikawa, Tokyo (JP); Makoto Kaneko, Tokyo (JP); Jin Itoh, Tokyo (JP); Youhei Saishu, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/080,969

(22) Filed: Feb. 22, 2002

(65) Prior Publication Data

US 2002/0116918 A1 Aug. 29, 2002

(30) Foreign Application Priority Data

Feb. 27, 2001 (JP) ........................................ 2001-052491

(51) Int. Cl.[7] ................................................ F01N 3/00
(52) U.S. Cl. .................... 60/285; 60/274; 60/286; 123/300; 123/305; 123/430
(58) Field of Search .................... 60/274, 285, 284, 60/286; 123/435, 430, 494, 27 GE, 299, 300, 305

(56) References Cited

U.S. PATENT DOCUMENTS 5,642,705 A * 7/1997 Morikawa et al. ............ 60/285
6,230,683 B1 * 5/2001 Zur Loye et al. ........... 123/435
6,276,334 B1 * 8/2001 Flynn et al. ................. 123/435
6,443,108 B1 * 9/2002 Brehob et al. ................ 123/64
6,449,946 B2 * 9/2002 Kuji et al. ..................... 60/286

FOREIGN PATENT DOCUMENTS

JP          337130          12/2000     ............. F01N/3/20

* cited by examiner

Primary Examiner—Thomas Denion
Assistant Examiner—Binh Tran
(74) Attorney, Agent, or Firm—Darby & Darby

(57) ABSTRACT

When an engine operates in a low and medium load area and in a low and medium speed area, the combustion mode is established to a compression ignition combustion and when the engine operates in other load and speed areas, the combustion mode is established to a spark ignition combustion. Further, when the compression ignition combustion is performed, the mixture is stratified in the combustion chamber and an ultra lean combustion is realized. As a result, both NOx reduction in an ultra lean condition and HC/CO reduction in an oxidation atmosphere can be obtained. On the other hand, when the spark ignition combustion is performed, a normal feedback control of air-fuel ratio activates a three-way catalyst to reduce HC, CO and NOx simultaneously.

3 Claims, 5 Drawing Sheets

ULTRA LEAN ZONE

STOICHIOMETRIC ZONE

COMBUSTION CONTROL APPARATUS FOR ENGINE

BACKGROUND OF THE INVENTION

1. Field of the Invention

The present invention relates to a combustion control apparatus for an engine and more particularly to a combustion control apparatus capable of switching a combustion mode over from a spark ignition combustion to a compression ignition combustion and vice versa according to engine operating conditions.

2. Discussion of Background Arts

Recent engines realize ultra lean mixture by charge stratification, intensive air turbulence and the like using in-cylinder injection type fuel injectors for directly injecting fuel into cylinders. These engines can operate with a wide range of air-fuel ratio by changing over between an operation with lean air-fuel mixture aiming at a better fuel economy and an operation with stoichiometric air-fuel ratio aiming at an improvement of air utilization ratio.

In general, when an engine operates in a condition of stoichiometric air-fuel ratio, hydrocarbons (HC), carbon monoxide (CO) and nitrogen oxides (NOx) in exhaust gas are purified by oxidation and reduction of a three-way catalyst. On the other hand, since a normal three-way catalyst has an inadequate purification capability of NOx due to the effect of excess oxidation under a condition of lean air-fuel ratio, a lean NOx catalyst capable of reducing NOx in an atmosphere of excess oxidation or a NOx occlusion catalyst for reducing NOx in a condition of rich air-fuel ratio or at an area of stoichiometric air-fuel ratio, are used in combination with the three-way catalyst (see Japanese Patent Application Laid-open No. Toku-Kai 2000-337130).

However, the lean NOx catalyst has a defect of small purification efficiency and its emission performance is insufficient. Further, since sulfur contained in fuel or lubrication oil is emitted as sulfuric oxides in exhaust gas, NOx reduction catalysts such as lean NOx catalyst and NOx occlusion catalyst are poisoned by these sulfuric oxides. As a result, the durability of catalyst is much more inferior to that of the three-way catalyst.

SUMMARY OF THE INVENTION

It is an object of the present invention to provide a combustion control apparatus capable of reducing NOx emissions under a condition of ultra-lean air fuel ratio without using NOx reduction catalysts and to provide a combustion control apparatus excellent in durability and reliability.

To attain the object, a combustion control apparatus for an engine having a three-way catalyst and a variable valve timing mechanism capable of varying valve opening and closing timings of intake and exhaust valves comprises an air fuel ratio zone establishing means for establishing an air fuel ratio zone to an ultra lean zone where an air fuel ratio is ultra lean, when the engine operates in a low and medium load area and in a low and medium speed area and for establishing an air fuel ratio zone to a stoichiometric zone where an air fuel ratio is stoichiometric, when the engine operates in other load areas and in other speed areas, and a combustion mode establishing means for establishing a combustion mode to a compression ignition combustion mode where a compression ignition combustion is executed, when the air fuel ratio zone is established to the ultra lean zone, and for establishing the combustion mode to a spark ignition combustion mode where a spark ignition combustion is executed, when the air fuel ratio zone is established to the stoichiometric zone. The spark ignition combustion is performed in accordance with a feedback control of air-fuel ratio while the three-way catalyst functions as a three-way catalyst and the compression ignition combustion is performed in accordance with a non-feedback control of air-fuel ratio while the three-way catalyst functions as an oxidation catalyst.

DESCRIPTION OF THE PREFERRED EMBODIMENT

Figure 1:
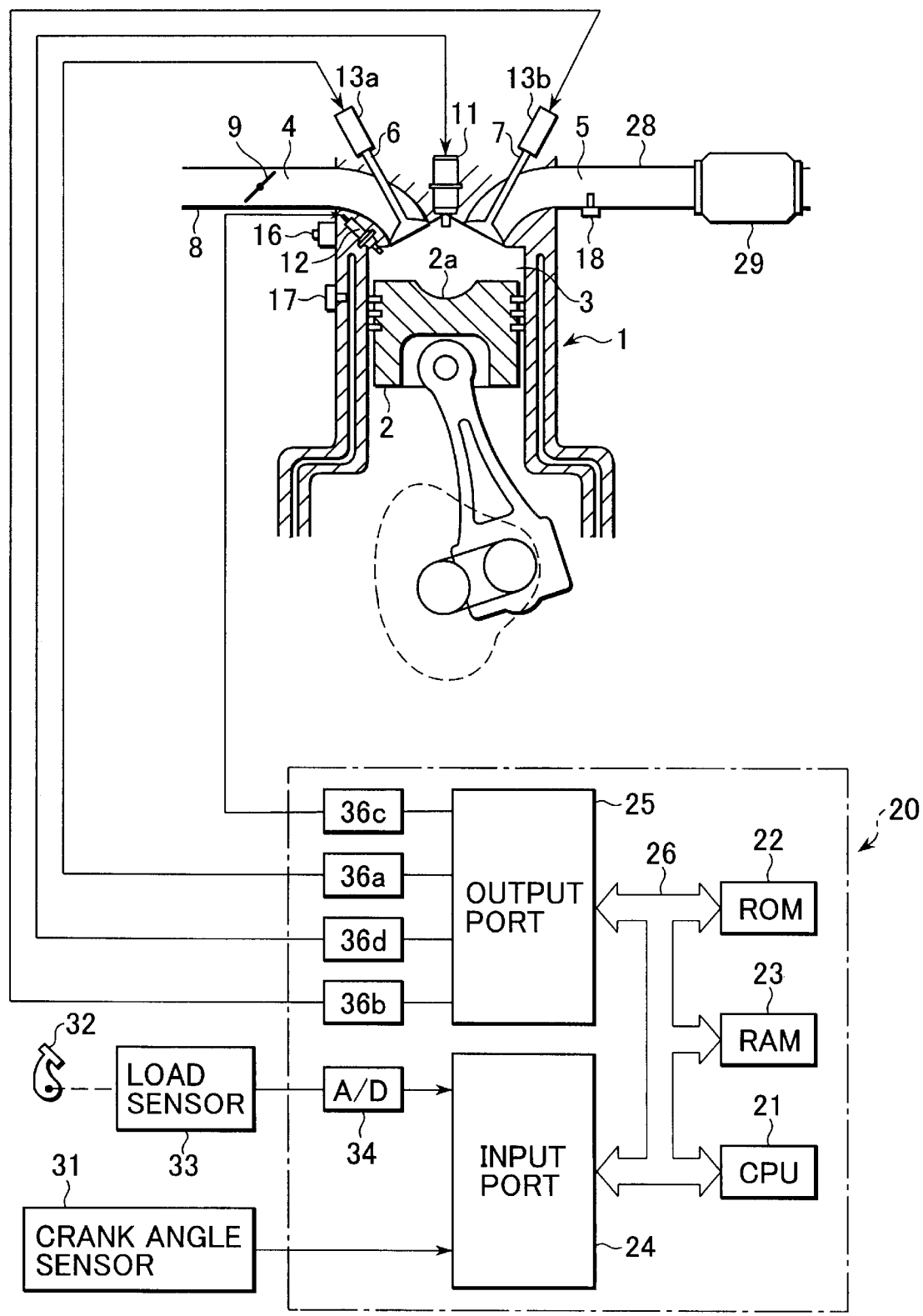
FIG. 1 is a schematic drawing showing an spark ignition engine according to the present invention.

Referring now to FIG. 1, reference numeral 1 denotes an engine, reference numeral 2 denotes a piston, reference numeral 3 denotes a combustion chamber, reference numeral 4 denotes an intake port, reference numeral 5 denotes an exhaust port, reference numeral 6 denotes an intake valve, reference numeral 7 denotes an exhaust valve, reference numeral 8 denotes an intake passage and reference numeral 9 denotes a throttle valve. The throttle valve 9 is interlocked with an electronic throttle control apparatus (not shown) which is electronically controlled. Further, an injection nozzle of a fuel injector 11 is provided in the center of a ceiling surface of the combustion chamber 3. Further, a piston cavity 2a which is inwardly concave is formed on the top surface of the piston 2 in an injection direction of the fuel injector 11. Further, an electrode of a spark plug 12 is provided on one side (squish area according to this embodiment). Reference numeral 16 denotes a knock sensor and reference numeral 17 denotes a coolant temperature sensor. Further, an oxygen sensor 18 is disposed in an exhaust passage 28 connecting to the exhaust port 5 and a three-way catalyst 29 is installed downstream of the oxygen sensor 18. The oxygen sensor 18 is a means f or detecting air-fuel ratio and the three-way catalyst 29 is for oxidize carbon mono-oxide (CO), hydrocarbons (HC) and for reducing or deoxidize nitrogen oxides (NOx).

Further, the intake vale 6 and exhaust valve 7 are interlocked with variable valve timing mechanisms 13a, 13b respectively. According to the embodiment of the present invention, the variable valve timing mechanism 13a has a two-way cam, a spark ignition intake cam and a compression ignition intake cam and the variable valve timing mechanisms 13b has a two-way cam, a spark ignition exhaust cam and a compression ignition exhaust cam. These respective cams are selected according to operation areas of the engine 1.

Figure 5A:
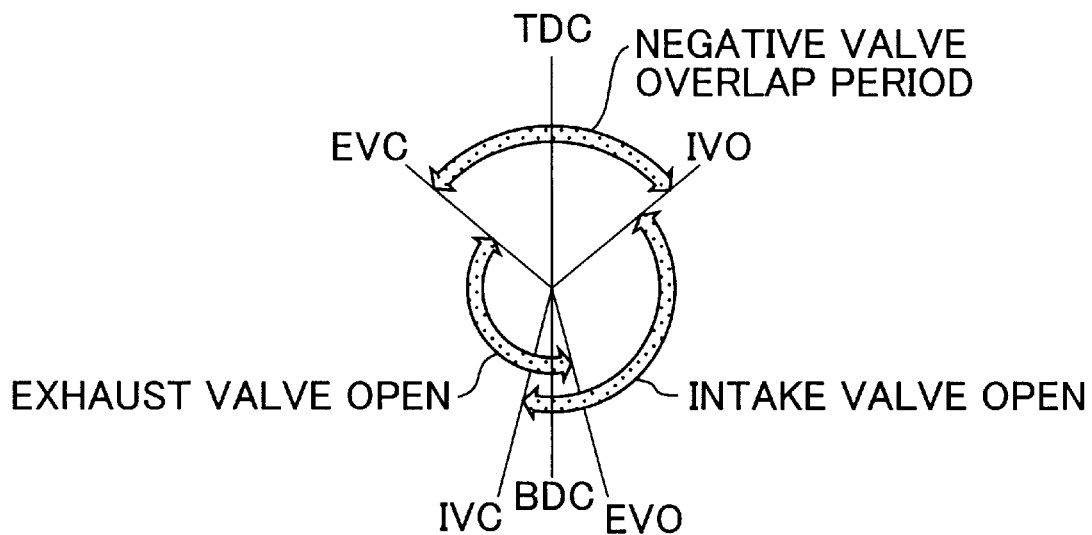
FIG. 5a is a diagram for explaining valve timings of intake and exhaust valves at an ultra lean area.

As shown in FIG. 5a, cam profiles of the compression ignition exhaust cam and the compression ignition intake cam are formed such that a valve closing timing of the exhaust valve 7 EVC and a valve opening timing of the intake valve 6 IVO are established so as to be almost symmetric to each other with the exhaust top dead center (TDC) between. As a result, a negative overlap period in which both valves 6, 7 are concurrently close is formed between the valve closing timing EVC and the valve opening timing IVO.

Figure 5B:
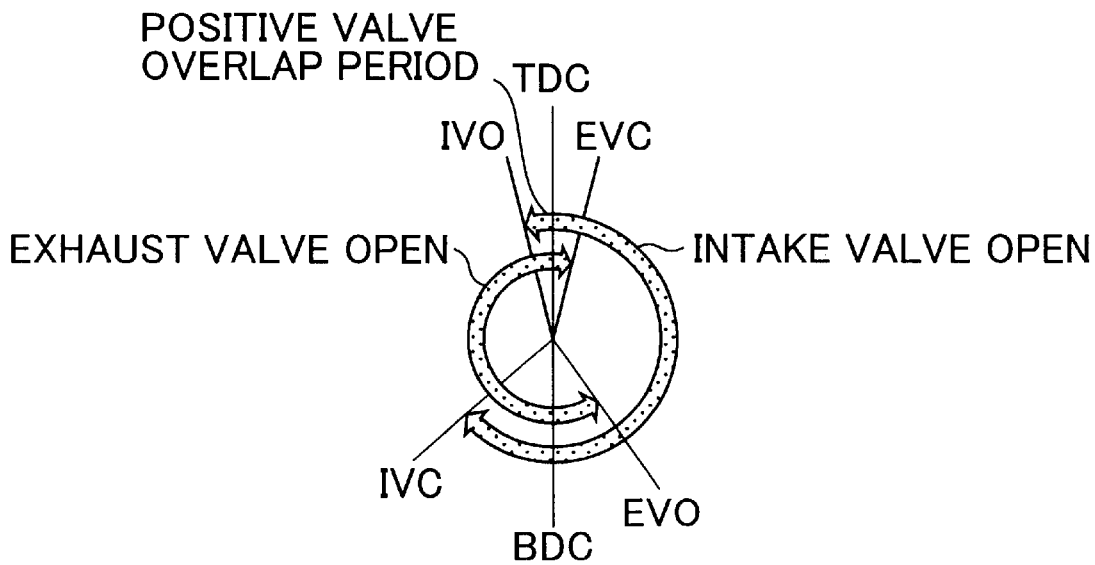
FIG. 5b is a diagram for explaining valve timings of intake and exhaust valves at a stoichimetric area.
Figure 6:
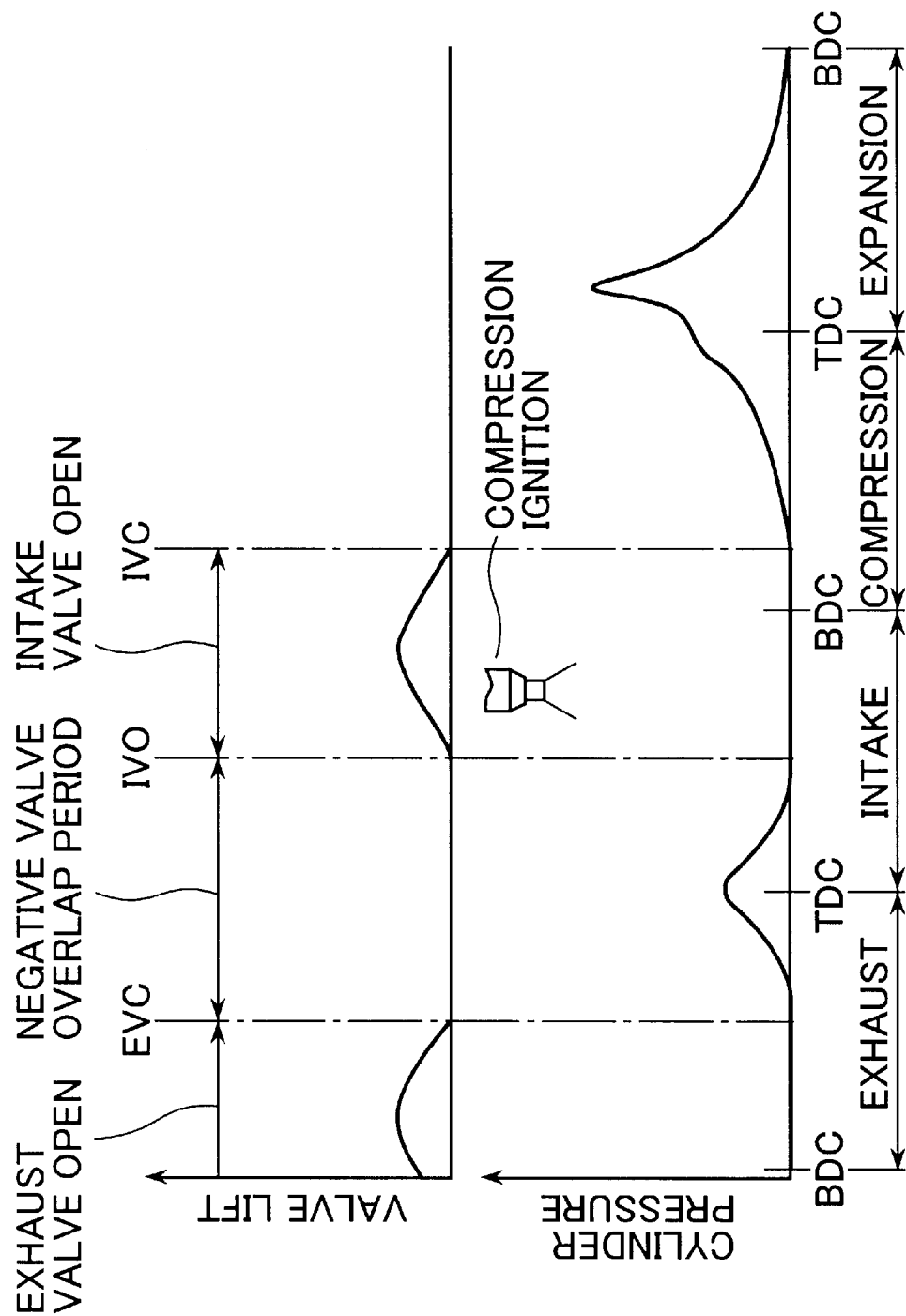
FIG. 6 is a diagram for showing a relationship between valve timings and cylinder pressure at a compression ignition combustion mode.

Further, as shown in FIG. 5b, cam profiles of the spark ignition intake cam and the spark ignition exhaust cam are established such that the valve opening timing of the intake valve 6 IVO is advanced before the exhaust top dead center (TDC) and the valve closing timing of the exhaust valve 7 EVC is retarded after the exhaust top dead center (TDC). As a result, a positive (normal) valve overlap period in which both valves concurrently open is formed in the neighborhood of the exhaust top dead center (TDC).

Further, signals sensed by the respective sensors are inputted to an electronic control unit (ECU) 20. The ECU 20 is a micro-computer constituted by CPU 21, ROM 22, RAM 23, an input port 24, an output port 25, a bus line 26 and the like.

Besides those sensors, the input port 24 is connected with a crank angle sensor 31 that generates crank pulses every specified crank angle and is also connected with a load sensor 33 that generates an output voltage corresponding to the amount of depression of an accelerator pedal 32 through an A/D converter 34. Further, the output port 25 is connected with the variable valve timing mechanisms 13a, 13b through an intake valve actuating circuit 36a, an exhaust valve actuating circuit 36b, respectively. Further, the output port 25 is connected with the spark plug 12 through an ignition drive circuit 36c and is connected with the in-cylinder injection type fuel injector 11 through an injector drive circuit 36d.

The electronic control unit (ECU) 20 obtains the current engine operating area parameterizing engine speed Ne calculated from a signal of the crank angle sensor 31 and engine load Lo calculated from a signal of the load sensor 33. Then, the ECU 20 investigates which area the current engine operating area is located in, an ultra lean zone or a stoichiometric zone. When the operating area is in the ultra lean zone, the combustion mode is established to a compression ignition combustion and when the operating area is in the stoichiometric zone, the combustion mode is established to a normal spark ignition combustion.

Figure 2:
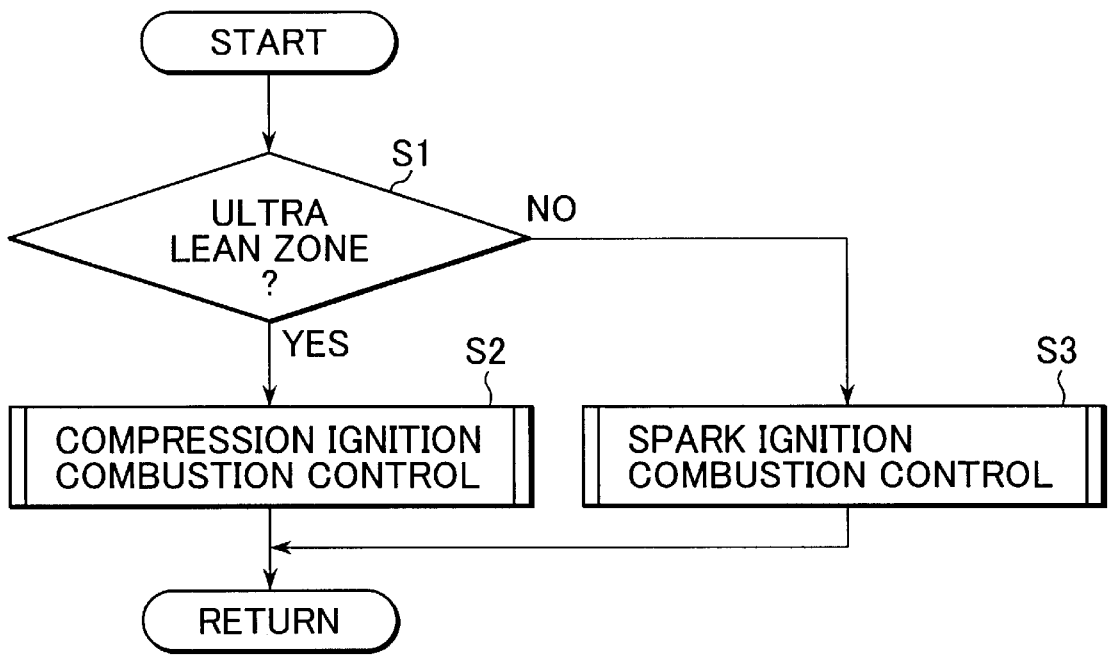
FIG. 2 is a flowchart of a combustion control routine.
Figure 3:
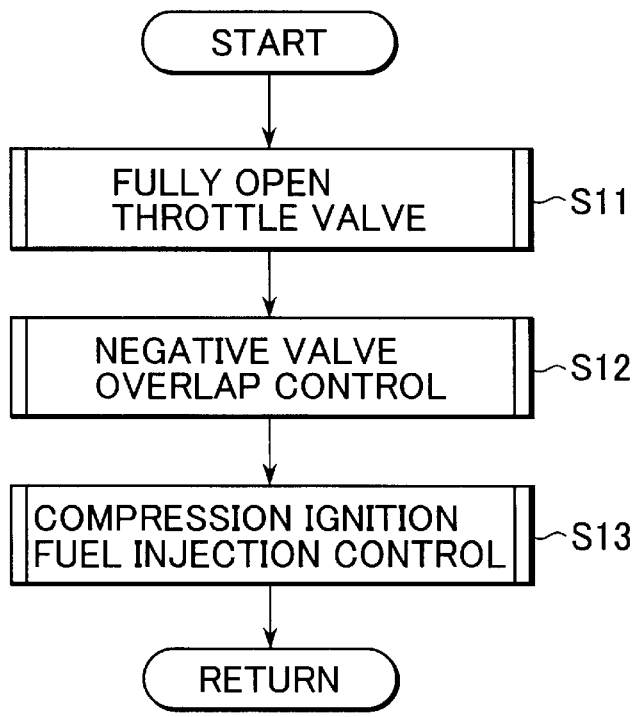
FIG. 3 is a flowchart of a compression ignition combustion control routine.
Figure 4A:
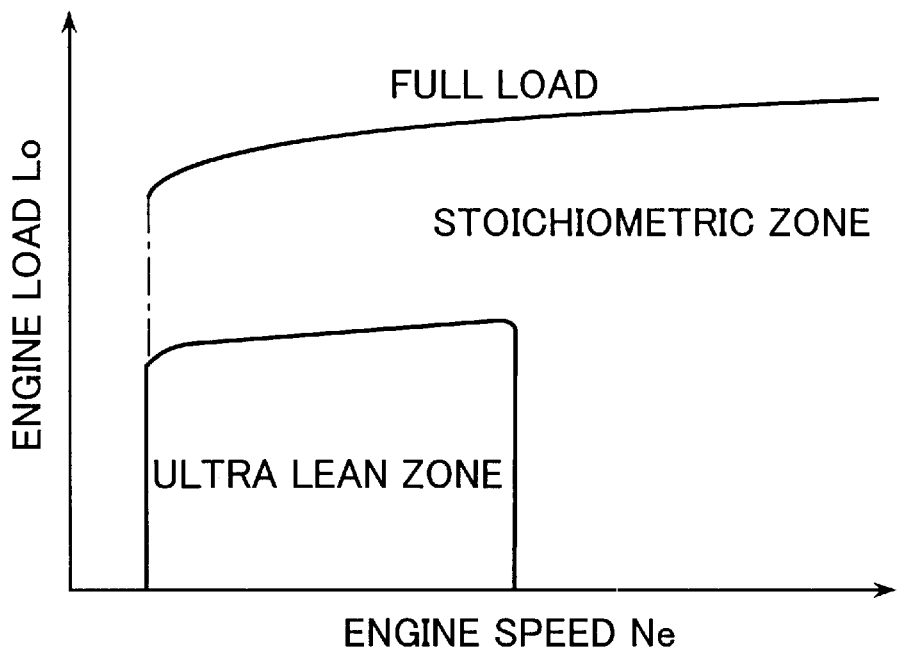
FIG. 4a is a diagram for explaining combustion modes.
Figure 4B:
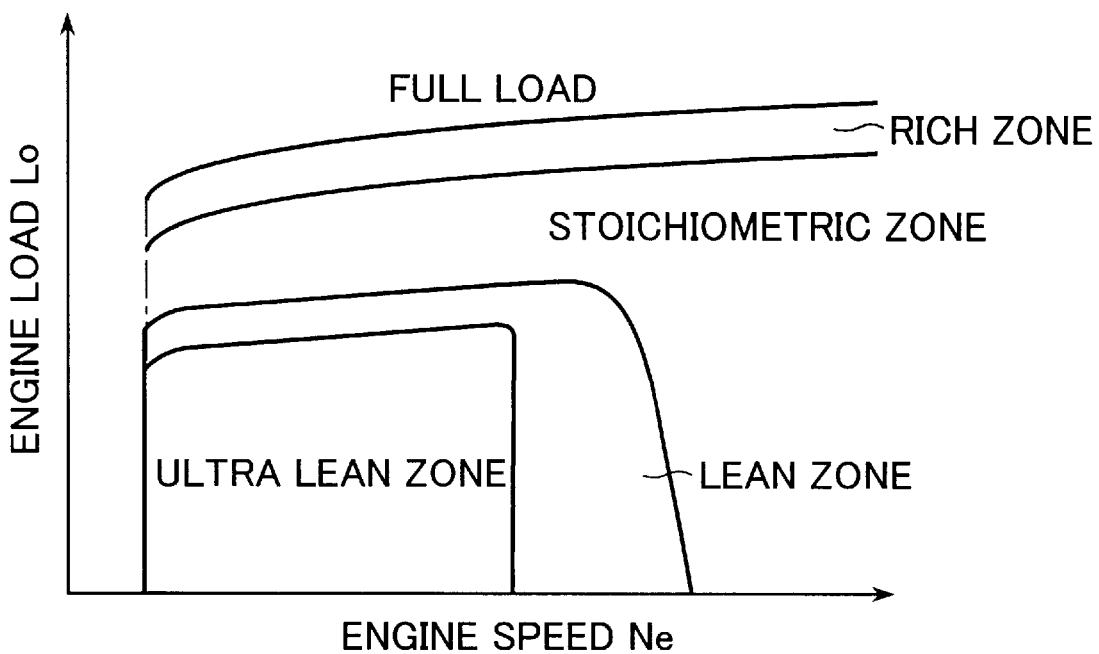
FIG. 4b is a diagram for explaining combustion modes.

Specifically, the combustion control executed in the ECU 20 is processed according to the combustion control routine shown in FIG. 2. In this routine, at a step Si a current operation area of the engine is investigated by reference to operation area judging tables shown in FIGS. 4a and 4b using the interpolation method based on engine load Lo and engine speed Ne. According to the operation area judging tables, an ultra lean zone is substantially established in a low and medium load and low and medium speed area and a stoichiometric zone is substantially established in a high load and high speed areas.

When the operation area is located in an ultra lean zone, the program goes to a step S2 where the compression ignition combustion control is carried out and leaves the routine. When the operation area is located in a stoichiometric zone, the program goes to a step S3 where the spark ignition combustion control is carried out and leaves the routine.

The compression ignition combustion control carried out in the step S2 is processed according to the compression ignition combustion control routine. In this routine, first at a step S11, the throttle valve 9 fully opens and at the next step S12, respective signals for selecting a compression ignition intake cam and compression ignition exhaust cam are outputted to the variable valve timing mechanisms 13a, 13b.

Then, as shown in FIG. 5a, the intake valve 6 and exhaust valve 7 perform opening and closing operations so as to form a negative overlap period in which both intake and exhaust valves 6, 7 concurrently close in the vicinity of the exhaust top dead center (TDC). As a result, the residual gas is shut in the combustion chamber 3 for the negative overlap period and the thermal energy of the residual gas heats up a charge sucked into the combustion chamber 3 at the intake stroke. As a result, the temperature of the charge in the combustion chamber 3 rises to reach the self ignitable temperature at the compression stroke.

Next, the program goes to a step S13 where the compression ignition fuel injection control is carried out and leaves the routine. In this compression ignition fuel injection control, the fuel injection quantity and fuel injection timing are variably established, respectively.

That is, the fuel injection quantity is controlled in such a manner that the air fuel ratio becomes lean gradually with a decrease of engine speed Ne and engine load Lo. On the other hand, the fuel injection timing is established at a relatively late timing in the latter half of the compression stroke, when the engine operates in a low load area and in a low and medium speed, and the fuel injection timing is established at a relatively early timing from the closing of the exhaust valve 7 (starting of the negative valve overlap) to the first half of the compression stroke, when the engine operates in a medium load area and in a low and medium speed area.

Thus, since fuel is injected from the in-cylinder injection type fuel injector 11 toward the combustion chamber 3 at a relatively late timing in the latter half of the compression stroke, stratified charge is locally formed in the combustion chamber 3 of which gas is reaching self-ignitable temperature and an ultra lean mixture becomes combustible. On the other hand, since the fuel injection timing is established at a relatively early timing after the closing of the exhaust valve 7, homogeneous mixture is formed before gas in the combustion chamber 3 reaches a self-ignitable temperature and as a result the whole mixture is concurrently ignited when the mixture reaches an ignitable temperature. Such combustion is a combustion not accompanied by flame propagations and is called "multi-spots combustion" like having an infinite number of spark plugs or "homogeneous compression ignition combustion".

Since the compression ignition combustion in an ultra lean condition is performed below the NOx formation temperature, very small quantity of NOx is emitted. Further, since the air excess ratio is high, the threeway-catalyst 29 acts as an oxidation catalyst in which CO and HC contained in exhaust gas are purified by oxidization. As a result, the compression ignition combustion in an ultra lean zone produces very clean exhaust emissions without the feedback control of air fuel ratio.

When it is judged at the step S1 that the operation area is in a stoichiometric zone, the program goes to a step S3 where a normal combustion control based on spark ignition is performed. According to this normal combustion control, first the ECU 20 outputs signals for changing the compression ignition cams to the spark ignition cams to the variable valve timing mechanisms 13*a*, 13*b*, respectively. As a result, the intake valve 6 and exhaust valve 7 operate according to the normal valve timing based on spark ignition, that is, the valve timing having a positive valve overlap period (see FIG. 5*b*) in which both valves 6, 7 concurrently open from the latter part of the exhaust stroke to the initial part of the intake stroke. The cam profiles of the spark ignition intake cam and the spark ignition exhaust cam are designed so as to have a maximum volumetric efficiency, respectively.

At the same time, the throttle valve 9 is returned to an interlocking condition with the accelerator pedal 32. Further, fuel injection quantity, fuel injection timing, ignition timing and the like are returned to the spark ignition control strategy. For example, in the fuel injection control, the feedback control is performed so that mixture gas is burned stoichiometrically based on the air fuel ratio detected by the oxygen sensor 18. Further, HC, CO and NOx are purified by the oxidation and reduction of the three-way catalyst 29.

Thus, according to the embodiment of the present invention, the combustion temperature can be reduced below the NOx formation temperature by introducing a compression ignition combustion in an ultra lean area and as a result the three-way catalyst can reduce NOx under an ultra lean condition without using lean NOx catalysts or NOx occlusion catalysts. Further, the durability and reliability of catalyst has been greatly improved.

Further, in an ultra lean area, due to the high air excess ratio, since the three-way catalyst can be functioned as an oxidation catalyst, the air-fuel ration feedback control comes into disuse.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments which can be embodied without departing from the principle of the invention set out in the appended claims.

What is claimed is:

1. A combustion control apparatus for an engine having an intake valve, an exhaust valve, a spark plug, a three-way catalyst, an air-fuel ratio detecting sensor and a variable valve timing mechanism for varying valve opening and closing timing of said intake and exhaust valves, comprising:

an air fuel ratio zone establishing means for establishing an air fuel ratio zone to an ultra lean zone where an air fuel ratio is ultra lean, when said engine operates in a low and medium load area and in a low and medium speed area and for establishing an air fuel ratio zone to a stoichiometric zone where an air fuel ratio is stoichiometric, when said engine operates in other load areas and in other speed areas; and a combustion mode establishing means for establishing a combustion mode to a compression ignition combustion mode where a compression ignition combustion is executed, when said air fuel ratio zone is established to said ultra lean zone, and for establishing said combustion mode to a spark ignition combustion mode where a spark ignition combustion is executed, when said air fuel ratio zone is established to said stoichiometric zone;

wherein said spark ignition combustion is performed in accordance with a feedback control of air fuel ratio while said three-way catalyst functions as a three-way catalyst.

2. A combustion control apparatus for an engine having an intake valve, an exhaust valve, a spark plug, a three-way catalyst, an air-fuel ratio detecting sensor and a variable valve timing mechanism for varying valve opening and closing timing of said intake and exhaust valves, comprising:

an air fuel ratio zone establishing means for establishing an air fuel ratio zone to an ultra lean zone where an air fuel ratio is ultra lean, when said engine operates in a low and medium load area and in a low and medium speed area and for establishing an air fuel ratio zone to a stoichiometric zone where an air fuel ratio is stoichiometric, when said engine operates in other load areas and in other speed areas; and a combustion mode establishing means for establishing a combustion mode to a compression ignition combustion mode where a compression ignition combustion is executed, when said air fuel ratio zone is established to said ultra lean zone, and for establishing said combustion mode to a spark ignition combustion mode where a spark ignition combustion is executed, when said air fuel ratio zone is established to said stoichiometric zone;

wherein said compression ignition combustion is performed in accordance with a non-feedback control of air-fuel ratio while said three-way catalyst functions as an oxidation catalyst.

3. A combustion control apparatus for an engine having an intake valve, an exhaust valve, a spark plug, a three-way catalyst, an air-fuel ratio detecting sensor and a variable valve timing mechanism for varying valve opening and closing timing of said intake and exhaust valves, comprising:

an air fuel ratio zone establishing means for establishing an air fuel ratio zone to an ultra lean zone where an air fuel ratio is ultra lean, when said engine operates in a low and medium load area and in a low and medium speed area and for establishing an air fuel ratio zone to a stoichiometric zone where an air fuel ratio is stoichiometric, when said engine operates in other load areas and in other speed areas; and a combustion mode establishing means for establishing a combustion mode to a compression ignition combustion mode where a compression ignition combustion is executed, when said air fuel ratio zone is established to said ultra lean zone, and for establishing said combustion mode to a spark ignition combustion mode where a spark ignition combustion is executed, when said air fuel ratio zone is established to said stoichiometric zone;

wherein said compression ignition combustion is performed in a lean air-fuel ratio condition and said spark ignition combustion is performed in a stoichiometric air-fuel ratio condition.

* * * * *